Dec. 27, 1966    R. LAWSON ETAL    3,294,178
AUTOMATIC VEHICLE GUIDANCE SYSTEM
Filed Feb. 16, 1965    4 Sheets-Sheet 3

United States Patent Office 3,294,178
Patented Dec. 27, 1966

3,294,178
AUTOMATIC VEHICLE GUIDANCE SYSTEM
Robert Lawson, Wigston Fields, Leicester, and Peter James Billing, Braunstone, Leicester, England, assignors to Associated Electrical Industries Limited, London, England, a British company
Filed Feb. 16, 1965, Ser. No. 433,119
Claims priority, application Great Britain, June 7, 1961, 20,569/61
14 Claims. (Cl. 172—3)

This application is a continuation-in-part of the three applications of Robert Lawson and Peter J. Billing, bearing Serial Number 198,340, filed May 28, 1962; Serial Number 235,807, filed November 6, 1962, and Serial Number 235,808, filed November 6, 1962, and all now abandoned.

This invention relates to the automatic guidance of self-propelled vehicles.

For the automatic guidance of a self-propelled vehicle a sensing device may be carried by the vehicle and arranged for controlling automatic steering apparatus of the vehicle to maintain the latter on a certain course relative to an energised wire. Such automatic vehicle guidance has application in agricultural and horticultural operations for example, in which a vehicle, such as a tractor, is arranged for drawing a plough or other implement over an area of ground to be cultivated. This may be achieved by causing the tractor for instance to follow a to and fro path comprising a number of parallel reaches.

According to the present invention there is provided an electrical guidance system for a self-propelled and automatically steerable vehicle capable of automatically following a path defined by a wire energised by alternating current, said system comprising a plurality of separately energisable loops of conducting wire embracing different overlapping land, all the loops having a section of their lengths lying co-extensively, a source of alternating current for energising said loops of conducting wire, switching means for selectively connecting said source of each of said loops of conducting wire individually, and means responsive to the passage of a vehicle a predetermined number of times around the path defined by an energised one of said loops of conducting wire to produce a transfer signal, said switching means being responsive to said transfer signal to disconnect said source of alternating current from the energised loop of conducting wire and connect it to another of said loops during the time that the vehicle is located on said co-extensive sections of the loops.

In carrying out the invention each of said loops of conducting wire may have two side arms joined at their ends by integral end connections, the side arms of all the loops of conducting wire being located in generally parallel spaced apart relationship with each other and corresponding ones of the end connections being generally in line with each other. The corresponding side arms of successive loops may be spaced apart by equal amounts.

The invention is particularly suited for use with a vehicle in which a sensing head mounted on the vehicle or two or more such heads have a number of laterally spaced positions and means is provided to change, in response to a signal, the lateral position from which control of the automatic steering device is exercised. In such cases, the vehicle can travel round each of the loops of conducting wire a number of times corresponding to the number of laterally spaced positions of the sensing head or heads and, if required, it can be arranged that successive circuits of a loop are laterally displaced in the same direction relative to previous circuits.

The actual path taken by the vehicle relatively to an energised loop of conducting wire may be controlled by the selection of one of a number of sensing heads arranged at laterally spaced positions relative to the fore and aft axis of the vehicle or, alternatively, a single sensing head may be provided for the purpose, said head being movable to any selected one of a number of lateral positions relative to the vehicle axis and thereby determining which of the available parallel paths the vehicle is to travel relatively to the energised loop of conducting wire.

As another alternative for controlling the path of the vehicle relatively to an energised loop of conducting wire sensing means carried by the vehicle comprises two sensing coils having mutually inclined axes disposed in at least one plane extending transversely to the fore and aft axis of the vehicle, together with means effective for selecting at least one of said coils for control of the vehicle, according to the desired path of travel of said vehicle relatively to the energised loop of conducting wire, the selected coil producing an output indicative of any deviation of said vehicle from the desired path, and reference means for deriving an output from the energised loop of conducting wire which when taken in combination with an output from the selected coil is indicative of the direction of deviation of the vehicle from the path, whereby the vehicle by the utilisation of said outputs can be maintained on any selected one of a plurality of paths parallel to the energised loop of conducting wire.

Control of an agricultural implement (e.g., plough) drawn by the vehicle, such as a tractor, can be exercised by providing an energised control wire extending transversely and preferably perpendicularly to the side arms of the loops of conducting wire at or near the ends of each loop so that the energised control wire can provide a control signal for causing the agricultural implement drawn by the vehicle to be rendered operative and inoperative (e.g., lowering and raising of a plough) when the vehicle crosses the wire at the commencement and completion of each traverse along one of the side arms of a loop. This control signal may be derived from the energised control wire by a single pick-up head which produces an output signal, the magnitude of which increases as the tractor approaches the transversely extending control wire, control of the plough actually being effected by the implement control means in response to the control signal attaining a predetermined value when the tractor crosses or is in close proximity to the transversely extending control wire. However, the position of the tractor relatively to the control wire at the instant when the plough is controlled may vary for different land areas travelled by the tractor due inter alia to variations in the depth of the control wire below ground level or as a result of variations in the characteristics of the pick-up head.

The above-mentioned variations in the positional relationship between the vehicle and the transversely extending control wire when the plough or other implement being drawn by the vehicle is controlled (e.g., lifted or lowered) are largely obviated by providing two pick-up heads mounted on the vehicle and spaced apart in the direction of travel of the vehicle in combination with means controlled by the outputs from said two pick-up heads and effective for bringing about the control of the implement only when the heads are located on respective sides of said control wire.

In order that the invention may be more fully understood reference will now be made by way of example to the accompanying drawings in which.

Figure 1:
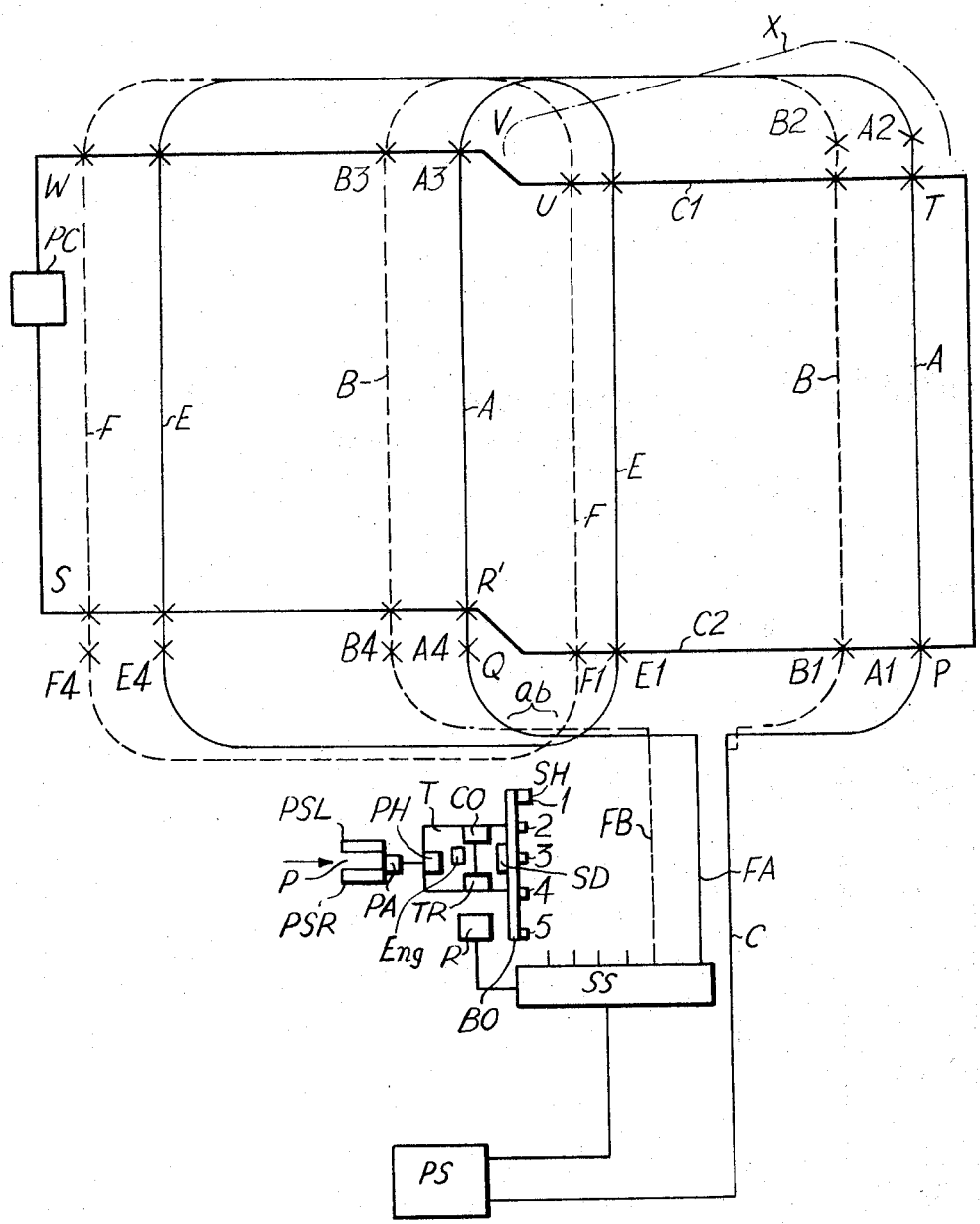
FIG. 1 shows in diagrammatic form an electrical guidance system conforming to the invention comprising an arrangement of conducting wires buried in a field for the purpose of guiding a tractor drawing a plough.

Referring to FIG. 1 in the system there shown, the arrangement of conducting wires defines six loops, only four of which designated A, B, E and F are shown so as not to overburden the drawing. These loops are buried in the ground at a distance lower than the maximum depth of ploughing. Each of the wire loops is generally rectangular in shape and embraces part of the area of the field to be ploughed, the land areas embraced by successive loops overlapping with each other. The loop A comprises parallel side arms extending respectively between points A1 and A2 and points A3 and A4. Points A2 and A3 are joined together by end connections, as are points A1 and A4 except that in the latter case the end connection is broken and connected to a pair of feeder wires, one of which indicated at C is connected to an alternating current supply source PS provided for instance at one end of the field and the other of which indicated at FA can be selectively connected to the power supply PS. The wire loop B is similar to loop A and comprises one side arm extending between points B1 and B2 and in parallel spaced apart relationship with the side arm of the loop A extending between points A1 and A2, but displaced to the left as viewed in FIG. 1, and a further side arm extending between points B3 and B4 which is in parallel spaced apart relationship with the side arm of the loop A extending between points A3 and A4, but displaced to the left by an amount equal to the displacement between the side arms A1, A2 and B1, B2. The loop B has an integral end connection between points B2 and B3 which is in line with the corresponding end connection of the loop A and there is an end connection completing the loop B between points B4 and B1 to which the feeder wire C and a further feeder wire FB are connected for the selective connection of the loop B to the power supply PS through selective switching means SS as will hereinafter be described.

Each of the remaining loops, including the loops E and F, is similar in shape to the loops A and B except that they are successively displaced to the left in FIG. 1, and as with the loops A and B they can be selectively connected to the power supply PS through the selective switching means SS which will complete a circuit from the supply source PS through the appropriate feeder wire FA, FB, etc. and back via the feeder wire C which is common to all of the loops A to F. Moreover, all of the loops have end connections which are co-extensive over a short section ab at one end of the field.

A tractor T drawing a plough P has self-propulsion means in the form of an engine Eng and an automatic steering device SD. The automatic steering device SD conveniently comprises a hydraulic piston and cylinder device having its piston coupled to a pivoted lever for steering the wheels of the tractor. The position of the piston of the device and thus the path travelled by the tractor is controlled by hydraulic pressure applied to the cylinder to act on different sides of the piston under the control of a solenoid device having coils arranged to be selectively energised under the control of sensing head means SH which, as will be described, is operable to derive from an energised one of the wire loops a signal condition for exercising such control.

The tractor T draws the plough P which is of the type having a set of right-hand shares PSR and a set of left-hand shares PSL, and, moreover, has conventional implement control means PA for raising and lowering either of these shares in accordance with a received control signal derived in the manner hereinafter described. To this end, the means PA conveniently comprises a conventional hydraulic actuator, a pivoted lever for controlling the actuator and an electric motor for operating the lever and having a driving circuit which is completed in response to a control signal derived by pick-up means PH when the latter crosses energised control wires C1 and C2. Consequently, a control signal from the means PH sets the motor in operation to lift or lower the plough, as appropriate, and limit switching means included in the implement control means serve to disconnect the motor drive once the plough assumes the desired position. The control wires C1 and C2 referred above extend transversely across the field one at or near each end of the side arms of the wire loops. These control wires C1 and C2 which are electrically separate from the loops A to F are energised with alternating current from a supply source PC. The frequency of this alternating current is different from that derived from the supply source PS. The control wire C2 has two sections joined together, one section extending between a point P and a point Q which is generally in line with the commencement of one of the side arms of all of the loops at points A1 to F1 inclusive. These side arms of the loops may be termed the "UP" side arms. The other section of the control wire C2 extends between points R' and S which are near the end of the other side arms of the loops which are termed the "DOWN" side arms, and crosses these side arms at points which are displaced at short distances from the ends of the side arms at points A4 to F4 inclusive.

The other control wire C1 also comprises two sections, one of which extends between points T and U and crosses the "UP" side arms of all the loops at a short distance from their ends, while the second section extends between points V and W at the ends of the "DOWN" side arms.

The selective switching means SS are controlled by the output from a receiver R which is located at a fixed point adjacent the co-extensive loop sections ab and which is arranged to pick up signals emitted by a transmitter TR mounted on the tractor T. The selective switching means SS may take the form of a uniselector which is stepped to its next outlay thereby completing an energising circuit for another wire loop each time the receiver R receives a signal from the transmitter TR consequent upon the tractor T taking up a position adjacent the receiver R as depicted in the drawing.

At the commencement of a ploughing operation, the tractor T will be driven manually to the position indicated in the drawing. The supply sources PS and PC are switched on and the supply source PS will energise the wire loop A by the selection of this loop by the selective switching means SS. It may be arranged, for example, that the selective switching means SS is homed after use so that it takes up a position in readiness for the energisation of loop A as soon as the supply source PS is switched on.

The sensing head means SH can control the steering device SD in a manner which causes the path of the tractor T to be such that any one of several selected lateral positions on a boom BO at the front of the tractor T may be located vertically above an energised wire loop. In FIG. 1 five lateral positions 1 to 5 are shown on the boom BO and, as will be described later with reference to FIG. 5, a single sensing head mounted on the boom BO can be moved to any one of the five positions 1 to 5 to cause the tractor T to assume a corresponding position relative to the energised wire loop. A similar effect can be achieved using five separate sensing heads mounted at the respective lateral positions 1 to 5, these heads being individually selected as required for control of the tractor steering device. The sensing head means SH may also be of the form to be described presently with reference to FIG. 2.

Assuming that the tractor T has its sensing head means SH arranged so that lateral position 1 is effective, the tractor T will travel along a path to the right of the wire of loop A until it reaches or crosses the control wire C2 at about the point A1, whereupon a control signal derived from the energised control wire by the pick-up means PH on the tractor is passed to the implement control means PA for energisation of a drive mtor as aforesaid in order to effect appropriate operation of the hydraulic actuator which causes one of the plough shares PSL and PSR to be lowered and ploughing will then take place while the tractor travels along the "UP" side arm of loop A until it reaches or crosses the control wire C1 near the end of its traverse when the pick-up means PH will derive another control signal from the energised control wire C1 and pass it to the implement control means PA to cause the plough shares to be raised. As will be described with reference to FIG. 5, this control signal is also effective to cause the sensing head means SH to transfer the steering control from position 1 to position 5 on the boom BO. This takes place while the tractor T travels along the end connection of loop A so that the path of the tractor is as represented purely diagrammatically by the chain-dotted line X. On reaching point A3 at the commencement of the "DOWN" side arm of loop A, the pick-up means PH derives another control signal from the energised control wire C1 which will cause the implement control means PA to lower the other plough shares and ploughing will take place while the tractor T travels along the "DOWN" side arm of loop A towards point A4. On nearing point A4, the tractor will cross the energised control wire C2 and a control signal derived by the means PH from this control wire and passed to the implement control means PA will cause the lowered plough shares to be raised and at the same time the sensing heads means SH will respond to this control signal to transfer the steering control from position 5 to position 2 on the boom BO during the time that the tractor travels from point A4 to point A1 so that when the tractor reaches point A1 for the second time it will be parallel to, but displaced to the left of its original line of travel along the "UP" arm of loop A. Accordingly, when the relevant plough shares are lowered again on crossing the energised control wire C2, a further ploughing operation will be performed on the strip of ground next to the previously ploughed strip. On reaching the control wire C1 again, another control signal will be derived by the means PH and this signal will be fed to the implement control means PA for raising the lowered plough shares and for effecting the transference of the steering control from position 2 to position 4 in time for ploughing to re-commence along the "DOWN" side of loop A. On reaching the end of the "DOWN" side arm of the loop A for the second time, the operative plough shares will be raised and the steering control transferred from position 4 to position 3 in readiness for ploughing along the "UP" arm of loop A. Steering control of the tractor from lateral position 3 on the boom BO will be maintained for travelling along the "DOWN" arm and at the end of this travel transfer of the steering control in response to a control signal derived by the means PH from the control wire C2 will take place to position 4 on the boom BO for the "UP" arm, position 2 for the "DOWN" arm, then position 5 for the "UP" arm and finally position 1 for the "DOWN" arm.

It will be appreciated that the tractor T will have now completed five complete circuits of the loop A and will have crossed the control wires C1 and C2 twenty times in all. The tractor carries a counter CO which counts the control signals derived from the control wires C1 and C2 and when the count reaches twenty an output from the counter CO energises the transmitter TR which accordingly transmits a signal arranged to be picked up by the fixed receiver R in order to operate the selective switching means SS which disconnects the supply source PS from the loop A and connects it for energising loop B through the appropriate feeder wires (i.e., C and FB). The counter CO may comprise a uniselector switch through contacts of which energising circuits can be completed for the transmitter TR.

Accordingly, the operation described above for loop A will be repeated for loop B and then for the third and fourth loops and loops E and F in sequence until the whole of the field has been ploughed.

It will be appreciated that by the tractor T following the circuits described, it will at no time travel over the ground that has already been ploughed.

As previously mentioned the receiver R will be positioned close to the co-extensive sections ab of the wire loops so that the transmitter TR will energise the receiver R as the tractor passes the receiver when the appropriate number of circuits have been completed. The transmitter TR can be de-energised in response to the next control signal derived from the control wire C2. When the transmitter TR is energised as it nears completion of the last circuit of the loop F, the signal transmitted by the transmitter TR, in response to the output from the counter C0, will be received by the receiver R and the consequent output from the receiver R will cause the selective switching means SS to switch to an open circuit position so that none of the loops will be energised. This also de-energises a solenoid in the tractor, and this cuts off the fuel from the engine.

A convenient frequency for energising the wire loops is, say, 2 kilocycles per second, while the control wires C1 and C2 can be energised at, say, 8 kilocycles per second. If an oscillator is used as the transmitter TR for the tractor, this can produce a signal at a third frequency of, say, 15 kilocycles per second.

Figure 3:
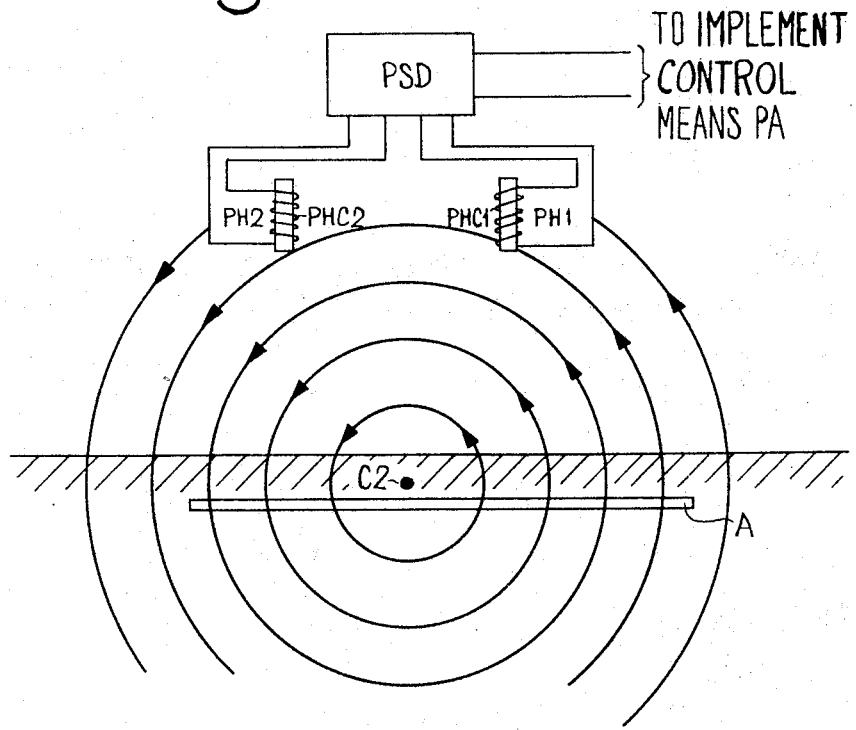
FIG. 3 shows in diagrammatic form the position of plough control magnetic sensing head coils relatively to an energised conducting wire of the guidance system of FIG. 1.
Figure 4:
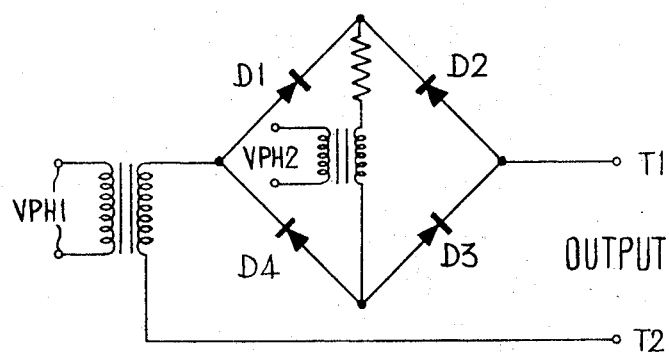
FIG. 4 is a circuit diagram of a phase-sensitive detector associated with the plough control sensing head coils.

Turning now to FIGS. 3 and 4 to consider the operation of the pick-up means PH. It will be recalled that at the commencement of a ploughing operation, the tractor T is driven manually to the position indicated in the drawings and then wire loop A is energised. The tractor T has its steering control located at lateral position 1 and accordingly the tractor will travel along the wire of loop A towards the control wire C2. Referring to FIG. 3, there are shown the control wire C2 as well as fragment of the wire loop A buried in the ground. The magnetic field produced by the alternating curren energisation of the control wire C2 is indicated for one half cycle of current fed through the control wire C2, the direction of this field simply being reversed for the alternate half cycle of energisation of the wire C2.

The tractor which will be travelling parallel to the wire loop A (e.g., to the right in FIG. 3) carries a pair of pick-up heads PH1 and PH2 having coils PHC1 and PHC2, respectively, with magnetic cores arranged with their axes vertical and spaced apart in the longitudinal direction of the tractor, that is to say the direction of travel of the latter. Thus, as the tractor T approaches the control wire C2, the coils PHC1 and PHC2 will be located on the same side (i.e., the left-hand side as viewed in FIG. 3) of the control wire C2, as a consequence of which the A.C. voltages induced in the coils PHC1 and PHC2 will be in phase with one another since the instantaneous components of the magnetic field acting along the axes of the magnetic cores of the heads PH1 and PH2 are unidirectional.

The outputs from the coils PHC1 and PHC2 are applied at VPH1 and VPH2 in the phase detector circuit shown in FIG. 4. The phase detector circuit includes a bridge rectifier comprising four half-wave rectifiers D1 to D4 and when the voltages VPH1 and VPH2 are in phase then a half-wave rectified output of one polarity will be produced across the output terminals T1 and T2 of the phase-sensitive detector circuit. This half-wave output from the phase-sensitive detector circuit PSD is fed to the implement control means PA, but is ineffective in causing their operation.

When the tractor has reached a position such that the pick-up heads PH1 and PH2 are located on opposite sides of the control wire C2 as illustrated, then the voltages induced in the sensing coils PHC1 and PHC2 will be in antiphase by reason of the reversal of the direction of the axial magnetic component of the field acting on the core of the pick-up head PH1. As a result, the polarity of the output from the phase-sensitive detector PSD will reverse to effect operation of the implement control means PA. This action of the pick-up heads is repeated each time they lie on opposite sides of a control wire and thereby only at such times do they produce effective control signals which are utilised as previously considered with reference to FIG. 1. The implement control means PA may be arranged in any suitable known manner so as to be responsive to only the correct polarity signal received from the phase-sensitive detector PSD and thereby constituting an effective control signal.

Figure 2:
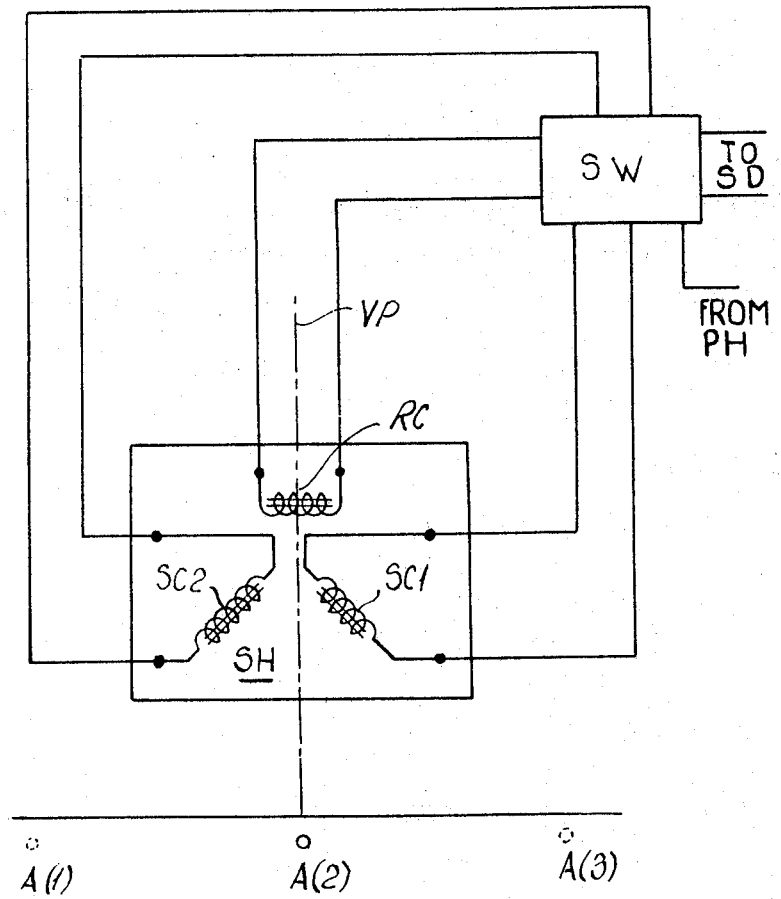
FIG. 2 is a diagram illustration of sensing head means carried by the tractor in FIG. 1 and associated with the arrangement of conducting wires of the guidance system.

The particular form of sensing head means SH shown in FIG. 2 comprises two iron-cored coils SC1 and SC2 having mutually perpendicular axes lying in a plane perpendicular to the fore and aft axis of the tractor (i.e. the plane of FIG. 2), the sensing coils being arranged symmetrically one on each side of vertical plane VP which contains the fore and aft axis of the tractor T. Mounted above the two sensing coils is an iron-cored reference coil RC having its axis extending perpendicular to the fore and aft axis of the tractor and lying in the same vertical plane as the axes of the two sensing coils SC1 and SC2. Such an arrangement enables the tractor T to travel along an energised loop of conducting wire of the vehicle guidance system, with the sensing head means SH located as a whole directly above the conducting wire (see wire position A(2) in FIG. 2), by selectively connecting the two sensing coils SC1 and SC2 in series opposition relationship under control of a control signal from a pick-up means PH (FIG. 1) also carried by the tractor T. By reason of the symmetry of the coil locations relative to the central vertical plane VP of the tractor containing the conducting wire, the resultant output from the coils SC1 and SC2 will be zero so long as the tractor travels along the energised wire. If the tractor deviates from its proper path, then a resultant output signal will be derived from the two sensing coils SC1 and SC2 connected in series opposition and the phase of this output relative to an output derived by the reference coil RC from the energised wire is indicative of the direction of deviation of the tractor T from its proper path. The output signals are utilised for the control of the automatic steering device SD of the tractor in order to restore the tractor to its proper path so that the output from the two series connected sensing coils is reduced to zero. In the case where the tractor is required to travel along a path parallel to the energised conducting wire of the guidance system as illustrated in FIG. 2 when the wire is in the position A(1) or A(3) (i.e. tractor fore and aft axis displaced laterally relatively to the vertical plane containing the conducting wire), one or other of the sensing coils SC1 and SC2 will be selected for control of the steering device SD of the tractor, according to the direction of travel of the tractor T and to which side of the energised conducting wire the tractor is to be located. For example, if the tractor were required to be displaced to the right of the conducting wire when travelling into the plane of FIG. 2, then the coil SC2 would be selected, whereas if the tractor travelling in the same direction were required to be displaced to the left of the conducting wire then the sensing coil SC1 would be selected. So long as the axis of the particular sensing coil selected, which axis is normally inclined at 45° to the vertical as shown, is in alignment with the energised conducting wire no output will be obtained from the selected sensing coil. However, an output derived from the selected sensing coil signifies that the tractor T has deviated from its proper path of travel and this output will be utilised in the control of the steering device SD of the tractor to bring the tractor back on to its proper couse, the actual direction of deviation of the tractor from its proper course and thus the sense of operation of the steering device of the tractor being determined by, and thus control of the steering is provided in accordance with, the phase of the output derived from the selected sensing coil relative to the phase of the output from the reference coil RC. The sensing coils SC1, SC2 and the reference coil RC may be selectively connected to the steering device SD under the control of switching means SW, such as in the form of a uniselector switch arranged to be stepped each time it receives a control signal from the pick-up means PH. It is to be appreciated that the sensing head means shown in FIG. 2 provides for any one of only three selected lateral positions on the boom BO, but a further sensing head could be provided to enable more than three lateral positions to be selected. Alternatively, the sensing head means SH as a whole could be moved laterally to provide the same end.

Figure 5:
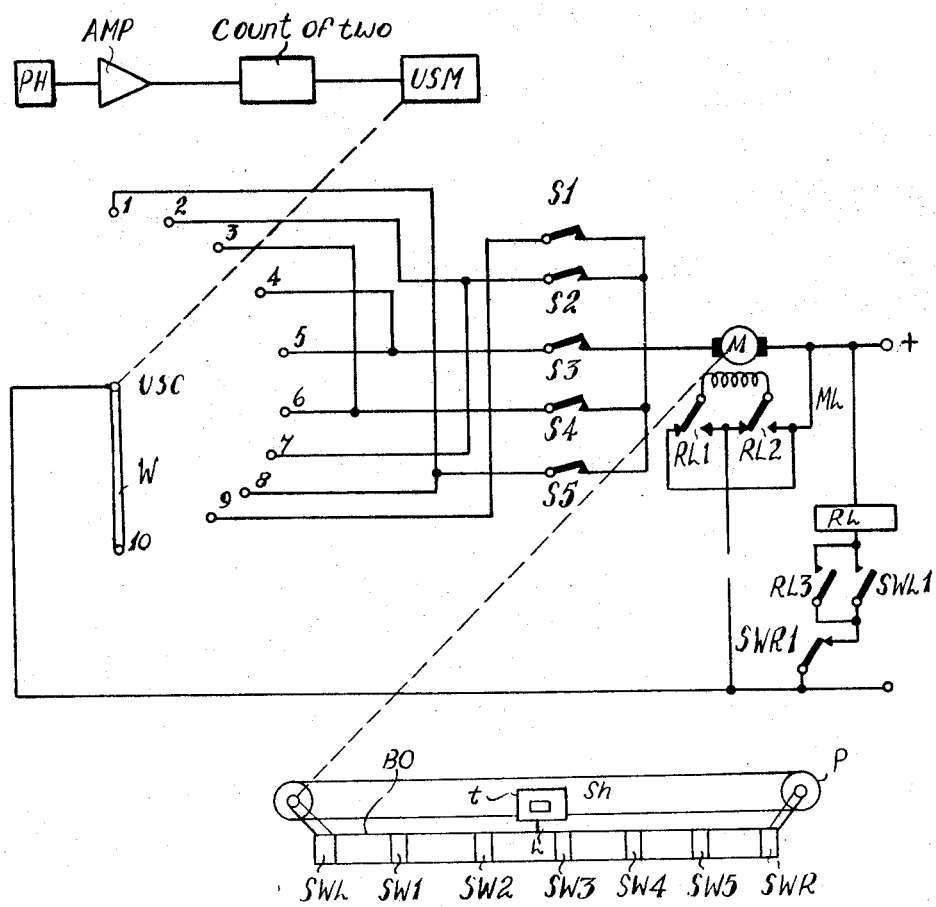
FIG. 5 is a circuit diagram of position changing means for a single sensing head.

The circuit diagram shown in FIG. 5 of the position changing means has facility for positioning a single head sh at any one of five lateral positions on the boom BO which is mounted transversely on the tractor T as mentioned previously with reference to FIG. 1. The boom BO has provided on its five trip switches SW1 to SW5, one at each of the five lateral positions, and two end trip switches SWL and SWR. All these trip switches are operable by means of a trip lever L carried on a trolley t on which the sensing head sh is mounted. The trolley t is movable along the length of the boom BO by means of a pulley arrangement P driven from an electric motor M. This motor M has its armature winding connected in an energising circuit comprising the contact bank USC of an electromagentically operable uniselector switch and contacts S1 to S5 which are selectively connected to the contacts of the contact bank USC and are controlled respectively by the position trip switches SW1 to SW5. A field coil ML of the motor M is connected for energisation under the control of a reversing relay RL, contacts RL1 and RL2 of which determine the direction of energising current through the winding ML and thus the direction of rotation of the motor M. The reversing relay RL is connected for energisation under the control of contacts SWL1 and SWR1 which are controlled respectively by the end trip switches SWL and SWR.

An electromagnet USM of the uniselector switch is connected to receive stepping pulses from a count-of-two element which, being for example a conventional bistable element, is operable to produce one stepping pulse for every two control signals applied to it, after amplification, from the pick-up means PH which aforesaid is mounted on the tractor T (FIG. 1) and is arranged to produce a control signal each time the tractor crosses one of the control wires (C1 and C2). The operation of the circuit of FIG. 5 is that for each stepping pulse, as produced by the count-of-two element for every two control signals received, a wiper W of the uniselector is stepped one step to complete an energising circuit for the motor M via the particular trip switch contact which is connected to the contact in the contact bank USC to which the wiper W has been stepped, so that the motor M drives the pulley P to move the trolley t along the boom BO. At each lateral position, the lever L on the trolley t operates the trip switch thereat to cause it to open the contact which it controls and when the contact through which the motor M is energised is opened the motor is de-energised and the trolley t with the sensing head sh mounted thereon comes to rest at the relevant lateral position. If the starting position and direction of travel of the trolley t are such that the lever L does not encounter trip switch controlling the contact through which the motor M is energised by the time it reaches either end of the boom BO, then this lever L operates the end switch SWL or SWR at the relevant end to cause the motor drive to be reversed by the reversing relay RL. Thus, if the relay RL is unoperated, the motor M is arranged to drive the trolley t from right to left as seen in the drawing so that when the trolley t reaches the left end of the boom BO the lever L operates the end switch SWL which in turn closes contacts SWL1. The relay RL is therefore operated and its contacts RL1 and RL2 change over to reverse the sense of energisation of the motor field winding ML. Contacts RL3 of relay RL maintain the operating circuit for relay RL on the reopening of the contacts SWL1 when the trolley t moves away from the left end of the boom BO towards the right. At the right end of the boom BO, the lever L operates switch SWR which as a consequence opens the contacts SWR1 to release the relay RL so that the sense of energisation of the motor field winding ML is again reversed due to the restoration of the change-over contacts RL1 and RL2.

The contacts of the uniselector contact bank USC are wired to the trip switch contacts S1 to S5 in a manner appropriate for the performance of the sequence of lateral position changes of the sensing head sh previously described with reference to FIG. 1 for causing the tractor to circuit the wire loop A five times along five discrete parallel paths.

What we claim is:

1. An electrical guidance system for a self-propelled and automatically steerable vehicle capable of automatically following a path defined by a wire energised by alternating current, said system comprising a plurality of separately energisable loops of conducting wire defining respective circuitous paths embracing different overlapping pieces of land, all the loops having sections of their lengths lying co-extensively adjacent one another, a source of alternating current for energising said loops of conducting wire, switching means for selectively connecting said source to each of said loops of conducting wire individually, and means responsive to the passage of a vehicle a predetermined number of times around the path defined by an energised one of said loops of conducting wire to produce a transfer signal, said switching means being responsive to said transfer signal to disconnect said source of alternating current from the energised loop of conducting wire and connect it to another of said loops during the time that the vehicle is located on said co-extensive sections of the loops.

2. An electrical guidance system as claimed in claim 1, wherein each of said loops of conducting wire has two side arms and two end connections linking said side arms at opposite ends thereof, said side arms of all the loops of conducting wire being located in generally parallel spaced apart relationship with each other and corresponding ones of said end connections of all the loops being generally in line with each other and partially overlapping to provide said coextensive sections.

3. An electrical guidance system as claimed in claim 2, comprising a control wire extending transversely to said side arms of the loops of conducting wire near each of said opposite ends thereof, and a source of alternating current for energising each said control wire, the frequency of alternating current of this source being different from that of the alternating current of the source for energising the loops of conducting wire.

4. An electrical guidance system as claimed in claim 3, a vehicle having propulsion means and automatic steering means, and control means mounted on said vehicle for controlling said automatic steering means, said control means comprising sensing head means having a number of laterally spaced discrete operative positions relatively to the direction of travel of the vehicle and operable to derive from an energised one of the loops of conducting wire a signal condition effective to cause said automatic steering means to steer said vehicle along such path defined by said energised loop that corresponds to the particular lateral operative position of the sensing head means, pick-up means for deriving a control signal from said control wires each time the vehicle crosses either of said control wires, and position changing means responsive to said control signal to change the lateral operative position from which the sensing head means exercises its control on the automatic steering means of the vehicle.

5. An electrical guidance system as claimed in claim 4, wherein there is provided an agricultural implement drawn by said vehicle, and said vehicle has also mounted on it implement control means responsive to successive ones of said control signals provided by said pick-up means to change said agricultural implement alternately between an operative condition and an inoperative condition.

6. An electrical guidance system as claimed in claim 4, wherein said sensing head means has at least one sensing head comprising two sensing coils having mutually inclined axes disposed in at least one plane extending transversely to the force and aft axis of said vehicle and capable of deriving outputs from an energised one of said loops of conducting wire being followed by the vehicle and having reference means also capable of deriving an output from such loop of conducting wire, and head switching means effective for selectively combining the output from said reference means with the output of one or other or both of said sensing coils according to the particular path of a plurality of paths to be travelled by the vehicle relatively to the energised loop of conducting wire, the so combined outputs being applied to said automatic steering means for guiding the vehicle along said particular path, the selected sensing coil output being indicative of any deviation of the vehicle from the said particular path and the phase thereof relative to the phase of the output from said reference means being indicative of the direction of such deviation of said vehicle from said particular path.

7. An electrical guidance systems as claimed in claim 6, wherein said two sensing coils of the sensing head are arranged so that their axes are mutually perpendicular in a common plane extending perpendicularly to the fore and aft axis of the vehicle, with the line bisecting the angle between the coil axes being perpendicular to the plane of travel of the vehicle.

8. An electrical guidance system as claimed in claim 7, wherein said reference means for deriving an output from the energised loop of conducting wire comprises a reference coil having its axis extending transversely to the fore and aft axis of the vehicle.

9. An electrical guidance system as claimed in claim 8, wherein said reference coil has its axis extending perpendicularly to the fore and aft axis of said vehicle and parallel to the plane of travel of said vehicle.

10. An electrical guidance system as claimed in claim 5, wherein said pick-up means comprises two pick-up heads mounted on said vehicle and spaced apart in the direction of travel of said vehicle, said pick-up heads being effective for producing a control signal only when they are located on opposite sides of either of said transversely extending control wires.

11. An electrical guidance system as claimed in claim 10, wherein said two pick-up heads are arranged so that electrical outputs therefrom are in phase when said heads are located on the same side of a control wire in the direction of travel of said vehicle and in phase displaced relationship when the heads are displaced on opposite sides of a control wire.

12. An electrical guidance system as claimed in claim 11, wherein each of said pick-up heads comprises a magnetic core, a sensing coil wound on said magnetic core and arranged with its axis vertical and the axes of the two coils being spaced apart in the direction of travel of said vehicle, and wherein there is provided a phase-sensitive detector to which the outputs from said coils are arranged to be fed for deriving an output of a polarity such as to constitute a control signal for causing operation of said implement control means only when the two sensing coils are located one on each side of the control wire.

13. An electrical guidance system as claimed in claim 12, wherein the phase-sensitive detector comprises a bridge rectifier circuit, a transformer to which the output from one of said pick-up heads is applied and which is connected in series with said bridge rectifier circuit, said bridge rectifier circuit comprising two pairs of serially connected similarly poled half-wave rectifiers, a branch connected in series with each of said pairs of half-wave rectifiers, and a further transformer connected in said branch and adapted to be fed with the output from the other pick-up head.

14. An electrical guidance system as claimed in claim 4, comprising a counting mechanism mounted on said vehicle and responsive to the control signals derived by said pick-up means from said control wires to count the number of times the vehicle crosses said control wires, a transmitter also mounted on said vehicle and connected to said counting mechanism for energisation thereby when the count made by said counting mechanism reaches a value corresponding to the passage of the vehicle around one of the loops of conducting wire a predetermined number of times, and a fixed receiver arranged for picking up a signal from the energised transmitter only when the vehicle is passing the said co-extensive sections of the loops of conducting wire, said receiver being responsive to such signal to produce the previously mentioned transfer signal for causing said switching means to switch energisation from one loop of conducting wire to another.

References Cited by the Examiner

UNITED STATES PATENTS

| | | | |
|---|---|---|---|
| 2,847,080 | 8/1958 | Zworykin et al. | 180—79.1 X |
| 3,039,554 | 6/1962 | Hosking et al. | 180—79.1 X |
| 3,147,817 | 9/1964 | Deliban | 180—79.1 X |
| 3,169,598 | 2/1965 | Finn-Kelcey et al. | 172—3 X |

OTHER REFERENCES

Erickson, W. H., et al., Electrical Engineering, New York, J. Wiley and Sons, 1959, pages 475–476.

ABRAHAM G. STONE, *Primary Examiner.*

F. B. HENRY, R. L. HOLLISTER,
*Assistant Examiners.*